United States Patent Office 3,594,422
Patented July 20, 1971

3,594,422
CHEMICAL PROCESS
Richard L. Golden, Oradell, N.J., and Gerald Mazzella, Brooklyn, N.Y., assignors to Halcon International, Inc.
No Drawing. Original application Jan. 29, 1965, Ser. No. 429,165, now Patent No. 3,423,471, dated Jan. 21, 1969. Divided and this application July 25, 1968, Ser. No. 747,434
Int. Cl. C07c 45/12
U.S. Cl. 260—586B
4 Claims

ABSTRACT OF THE DISCLOSURE

This invention relates to an improved process for the recovery of boron compounds used to form borate esters in hydrocarbon oxidation processes, which comprises removing dissolved and entrained organic material from the aqueous phase of the hydrocarbon oxidation process by adsorption in a carbon bed.

---

This application is a divisional continuation application of Ser. No. 429,165 filed Jan. 29, 1965 now U.S. Pat. 3,423,471 issued on Jan. 21, 1969.

This invention relates to an improved process for the oxidation of hydrocarbons in the presence of boron compounds. More specifically it relates to improved techniques for the effective recovery of boron compounds from the oxidation mixtures and for the efficient reuse of these compounds.

The use of boron compounds is of significant value in hydrocarbon oxidation processes where high yields of alcohol and ketone are desired. When boron compounds, as for example boric acid, meta boric acid, tetra boric acid, boron oxide or others are present in a hydrocarbon mixture undergoing oxidation by molecular oxygen, reactions take place between these compounds and the peroxides, alcohols, and other partial oxidation products formed, and borate or perborate esters are formed. The esters are then hydrolyzed with water forming thereby the alcohol and boric acid.

The aqueous and organic phases in the hydrolysis effluent are separated and the latter can be distilled to recover alcohol. Boric acid is recovered from the aqueous phase by crystallization, dehydrated, and reused in the oxidation step.

Serious process problems, however, are encountered in the crystallization and boric acid recovery steps. Very small amounts of organic material entrained in the aqueous phase, cause the adherance of solid boric acid to the surfaces of the crystallizing vessel; this results in the growth of heavy deposits on these surfaces. The rate of accumulation of these deposits is such that the majority of the boric acid can be found adhering to the surfaces rather than as suspended crystals. The formation of such deposits in crystallizers is known in the art but the rate of deposition in this case is extraordinary and leads not only to difficulty in recovering the boric acid but also to abnormally frequent shutdowns of the crystallization equipment.

It is an object of this invention to provide an improved process for the recovery of the boron compounds used to form borate and perborate esters in hydrocarbon oxidation processes wherein high selectivities to the hydrocarbon alcohol are desired.

It is a further object of this invention to provide improved techniques for the efficient crystallization of boric acid from the aqueous phase of the mixture formed when the borate or perborate esters are hydrolyzed with water.

It is a further object of this invention to provide a technique whereby the boric acid can be recovered efficiently from the aqueous phase of the hydrolysis step, as uniform, freely-suspended crystals and to assure thereby their succesful reuse in the oxidation step.

It is a still further object of this invention to provide techniques whereby the crystallization equipment can be operated continuously and without the necessity of frequent shutdowns due to the formation of unmanageable cakes in the internals of the equipment.

Othe objects will be apparent from the following description of the invention.

In accordance with the present invention it has been discovered that the boric acid dissolved in the aqueous hydrolysis effluent can be efficiently recovered, and boric acid caking in the crystallizer can be avoided, if the aqueous phase is treated so as to reduce the total contained organic material to a level such that when the aqueous phase is cooled and/or concentrated in a crystallizer, the total organic material entrained in the mother liquor, as distinguished from that dissolved in the mother liquor, is less than about 0.01% by weight.

And it has been discovered that by so treating the aqueous phase the necessity for plant shutdown is greatly reduced; the size of the crystallization equipment is reduced and problems in operating the boric acid recovery system are avoided.

It has further been discovered that the loss of boron values in the crystallizer is greatly reduced.

Only organic material that is entrained in the mother liquor during crystallization creates problems during the crystallization of boric acid; organic material which remains dissolved in the aqueous phase during crystallization can obviously have no effect upon the crystals nor cause boric acid deposits to form on the surface of the crystallization zone. The organic material contained in the aqueous phase after the hydrolysis step is both dissolved and entrained. The relative and absolute amounts of each depend upon the hydrocarbon being oxidized, the extent of its oxidation, the amounts and types of oxygenated by-products formed, the effectiveness of the phase separation, and the hydrolysis temperature. It is therefore impossible to generalize as to the total amount, the nature, or the physical form, that is whether dissolved or entrained, of the contained organic material. It has been discovered, however, that a sufficient organic material must be removed from the aqueous phase to ensure that when the temperature of the system is lowered, or water is removed from the system or combination of these procedures are carried out, the amount of entrained organic material in the mother liquid does not exceed about 0.01% by weight.

Since most organic materials encountered in the oxidations embraced by this invention have a solubility in water orders of magnitude less than 0.01% by weight, it is usually necessary to remove only entrained organic material from the aqueous phase; any organic material coming out of sodium during the cooling and/or concentration of mother liquor would be negligible. Therefore where supersaturation is induced by mother liquor cooling the amount of entrained organic material must be reduced to about 0.01% by weight, but where supersaturation is induced by mother liquor concentration, as by either evaporative or vacuum means, the amount of entrained organic material must be reduced to less than about 0.01% by weight so as to ensure that the final crystallization liquor will not contain more than about 0.01% by weight.

Some of the organic materials encountered may have a solubility in water in the range of or exceeding about 0.01% by weight. Highly oxygenated residues in particular may have such a solubility. In such systems, dissolved as well an entrained organic materials must be removed. Since both the cooling or the concentration of the mother liquor may cause dissolved organic material to come out of solution, care must be taken to reduce the amount of both forms of contained organic material to ensure that at the lowered temperature the amount of free organic material in the mother liquor does not exceed about 0.1% by weight.

The organic material can be removed from the aqueous phase by adsorption in a carbon bed. The organics will absorb on the carbon leaving a clarified solution which can be sent to the crystallizer.

The contacting may be batchwise, as by admixture of granulated carbon to the aqueous phase, agitation of the mixture, and filtration of the spent carbon from the mixture; or may be continuous as by passing the aqueous solution through a carbon bed. The carbon can be reactivated after it has become saturated with organics by subjecting it to a high temperature steam flow whereby the organics will be vaporized.

The temperature of adsorption must be high enough to avoid deposition of boric acid but low enough to avoid degradation of organics. The temperature of adsorption can be 30° C. to 120° C., but is desirably 50° C. to 110° C. and is preferably 70° C. to 100° C.

The pressure is not critical and may be atmospheric to 300 p.s.i.g.; desirably the pressure is atmospheric to 50 p.s.i.g., and preferably the pressure is atmospheric to 25 p.s.i.g.

The amount of carbon required depends upon the amount and type of organic in the aqueous solution; usually 0.005 to 1.0 lb. per lb. of solution are required.

Where evaporative or vacuum means are used to induce supersaturation in the mother liquor, and relatively light organics are involved, some of the organics may be removed in the crystallizer itself by vaporization along with the mother liquor. This means is especially appropriate where considerable water must be removed before crystallization is induced. However, the solution from which crystals are deposited must nevertheless contain less than 0.01% by weight of free organic.

The following examples indicate the effect upon boric acid crystallization from aqueous hydrolysis effluent of reducing the organic content of the mother liquor to less than 0.01% by weight of the total solution. All parts and percents are parts and percents by weight.

EXAMPLE I 100 parts of cyclododecane and 4 parts of metaboric acid are oxidized using air as the oxidizing gas at 170–175° C. and atmospheric pressure. The oxidation is carried out in an agitated reactor equipped with an overhead condenser and decanter for separating the water for oxidation. When sufficient oxygen has been absorbed to effect 15% conversion of the hydrocarbon, the reactor contents are discharged to a hydrolyzing tank. Hydrolysis of the borate esters is effected by contacting the oxidation effluent with a saturated solution of boric acid, at 85° C. in a ratio of 1.4 lbs. of oxidate per lb. of aqueous phase, and agitating at 97–100° C. for 1 hour. After a 15 minute settling period, the liquid phases are separated by decantation.

Crystallization of the boric acid contained in a portion of the aqueous phase withdrawn from the hydrolysis tank is conducted batchwise in an agitated, surface-cooled crystallizer constructed partly of glass and partly of 316 stainless steel. The rate of cooling from 97° C. is controlled to give a crystallization rate of 3 to 4 lbs. orthoboric acid per hour per ft.$^3$ At 85° C. the crystalline boric acid is filtered from the mother liquor.

Inspection of the internals of the crystallizer shows all metal parts to be heavily coated with boric acid. The yield of freely suspended boric acid is poor.

EXAMPLE II

A portion of the aqueous boric acid solution prepared in the hydrolysis step of Example I is charged to an agitated vessel along with 2.5% powdered activated carbon. The slurry is agitated vigorously for 1 hour at 95–97° C., at atmospheric pressure, and is then filtered to recover a clear solution. The clear filtrate contains less than about 0.01% of residual high boiling organic material.

Boric acid is crystallized from the carbon treated aqueous solution in a manner similar to that described in Example I. Inspection of the crystallizer after completion of the crystallization step shows all internal parts to be free of any solid coating. The yield of freely suspended crystalline boric acid is high.

EXAMPLE III

Docosene is oxidized by the procedures illustrated in Example I. The oxidation product is hydrolyzed and boric acid is crystallized from a portion of the aqueous hydrolysis effluent. Prior to crystallization, the aqueous phase contains in excess of 0.01% organic material. Results are obtained similar to those in Example I.

Another portion of the aqueous hydrolysis effluent is treated with activated carbon by the method described in Example II, the organic content being reduced thereby to less than 0.01%. In the crystallization of boric acid, results are obtained similar to those in Example II.

The compounds which can be oxidized with molecular oxygen in the presence of boron compounds and which create the crystallization problems herein described are substituted or unsubstituted, saturated or unsaturated, cyclic or acyclic hydrocarbons containing from 8 to 30 carbon atoms. $C_6$ compounds and their oxygenated derivatives, such as cyclohexane, though present in hydrolysis liquor to a greater extent than $C_8$–$C_{30}$ compounds, do not cause the severe coating in the crystallizer.

Illustrative of these compounds are paraffins such as octane, decane, dodecane, tetradecane, eicosane, docosane, triacontane and the like; olefins such as octene, dodecene, eicosene, docosene, and the like; cycloalkanes, such as cyclooctane, cyclododecane, cyclooctadecane, cyclodocosane and the like; mono- or poly-alkyl, aryl, alkaryl or aralkyl substituted cycloalkanes such as methyl heptecane and the like. The hydrocarbons can contain non-hydrocarbon substituent groups which are stable during the oxidation reaction such as hydrocarbon ester groups, borate ester groups, nitro groups, solfone groups, and the like. Examples of such substituted compounds are cyclododecylclacetate, cyclododecylborate, methylcyclododecyl phenyl sulfate, nitro-cyclododecane, and the like.

Boron compounds which are used in the oxidation are those compounds which can react with the product alcohol to form a borate ester. This also includes boron compounds which react with hydroperoxides to form either borate or perborate esters. Boron compounds particularly suitable for use in the oxidation are boric acid, metaboric acid, tetraboric acid or boron oxide.

The boron compounds are employed in an amount effective to improve the selectivity of the oxidation reaction. It is desirable to employ sufficient of the boron compound to react with all of the hydrocarbon alcohol to form the borate ester thereof. Lesser amounts can be employed where lower selectivity improvements are permissible. It is preferable, however, to employ amounts of the boron compound in excess of that necessary to react with all of the alcohol. The preferred range is 0.4 to 20 parts by weight boron compound, expressed as meta boric acid, per 100 parts of boron hydrocarbon feed mixture.

Air is normally employed to provide the molecular oxygen, although mixtures of oxygen with inert gases wherein the oxygen is present in greater or lesser amounts than in air can also be employed.

The oxidation reaction conditions can be those previously employed in the oxidation of hydrocarobns to alcohols and ketones. A catalyst such as cobalt or manganese can be employed, preferably in the form of a soluble salt such as the naphthenate, although such catalysts are not necessary.

Suitable oxidation reaction temperatures are broadly 75° to 300° C., desirably 100° to 200° C. and preferably 140° to 180° C. It is necessary that the reaction be carried out with efficient removal of water which is either formed by the oxidation and esterification, contained in the feed air, or formed by dehydration of the boron compound. The water removal is preferably accomplished by continuously removing a hydrocarbon-water vapor mixture during the reaction, condensing these components, separating water and recycling the hydrocarbon to the reaction. Other water removal techniques can be employed.

The reaction pressure is maintained at a sufficient level to insure that most of the hydrocarbon remains in the liquid phase at the reaction temperature while at the same time permitting a high boil-up rate of the hydrocarbon-water vapor mixture so that water removal is facilitated. Illustrative pressures are in the range of 10 to 500 p.s.i.g.

Reaction initiator, e.g., hydrocarbon ketone can be employed. Reaction times generally in the range of 10 minutes to 15 hours are suitable.

At the termination of the oxidation reaction, the reaction mixture contains a substantial amount of the hydrocarbon in the form of a borate ester thereof. If desired the borate ester can be recovered as such. In order to recover the alcohol, as such, it is desirable to subject the oxidation reaction mixture to a hydrolysis. The hydrolysis is readily accomplished, for example, by adding water or preferably an aqueous solution of boric acid to the oxidation reaction mixture, agitating the mixture, and heating if necessary, e.g., to 50–150° C. It is preferable to use an excess of water over that required to hydrolyze the ester.

The hydrolysis mixture is then allowed to settle into two phases, a lighter organic phase and a heavier aqueous phase. The latter containing boric acid and minor amounts of dissolved and entrained organic matter is withdrawn from the settling zone and fed to the crystallizer.

After treatment by the method of this invention, crystallization from the aqueous phase is carried out by cooling to the crystallization point of the boric acid.

Supersaturation may be induced by any of the methods known to the art, for example: cooling the feed by heat exchange, evaporating mother liquor by supplying heat, or vaporizing mother liquor by evacuating the crystallizer.

The crystals formed may be removed from the mother liquor in any known manner, for example, by centrifugation or vacuum filtration.

In view of the foregoing disclosures, variations and modifications thereof will be apparent to one skilled in the art, and it is intended to include within the invention all such variations and modifications except as do not come within the scope of the appended claims.

What is claimed is:

1. In a process for the oxidation of hydrocarbons containing 8 to 30 carbon atoms in the presence of a boron compound wherein the reaction mass contains boron esters of alcohols corresponding to said hydrocarbons, wherein said reaction mass is hydrolyzed to form an organic phase containing alcohols corresponding to said hydrocarbons and an aqueous phase containing boric acid and wherein said boric acid is recovered by crystallization from the aqueous phase, the improvement of: removing sufficient dissolved and entrained organic material from said aqueous phase prior to crystallization of boric acid, to ensure that the mother liquid, from which boric acid crystals form, contains less than about 0.01% by weight entrained organic material, said removal of said organic material being accomplished by contacting said aqueous phase with 0.005 to 1.0 pound of activated carbon per pound of said aqueous phase at a temperature of 30 to 120° C. and at a pressure of from atmospheric to 300 p.s.i.g.

2. A process of claim 1 wherein the hydrocarbon is cyclododecane.

3. A process of claim 1 wherein the hydrocarbon is a normal paraffin material containing from 10 to 16 carbon atoms.

4. A process of claim 1 wherein the hydrocarbon is normal decane.

References Cited

UNITED STATES PATENTS

| | | | |
|---|---|---|---|
| 2,410,462 | 11/1946 | Farkas | 260—586B |
| 3,109,864 | 11/1963 | Fox | 260—586B |
| 3,287,423 | 11/1966 | Steeman | 260—617H |

OTHER REFERENCES

Wiberg, "Lab. Technique in Org. Chem.," p. 154 (1960).

Mantell, "Adsorption," p. 120 (1951).

BERNARD HELFIN, Primary Examiner

N. P. MORGENSTERN, Assistant Examiner

U.S. Cl. X.R.

23—59; 260—597R, 617H, 631B, 632CB, 462A